United States Patent Office 3,453,076
Patented July 1, 1969

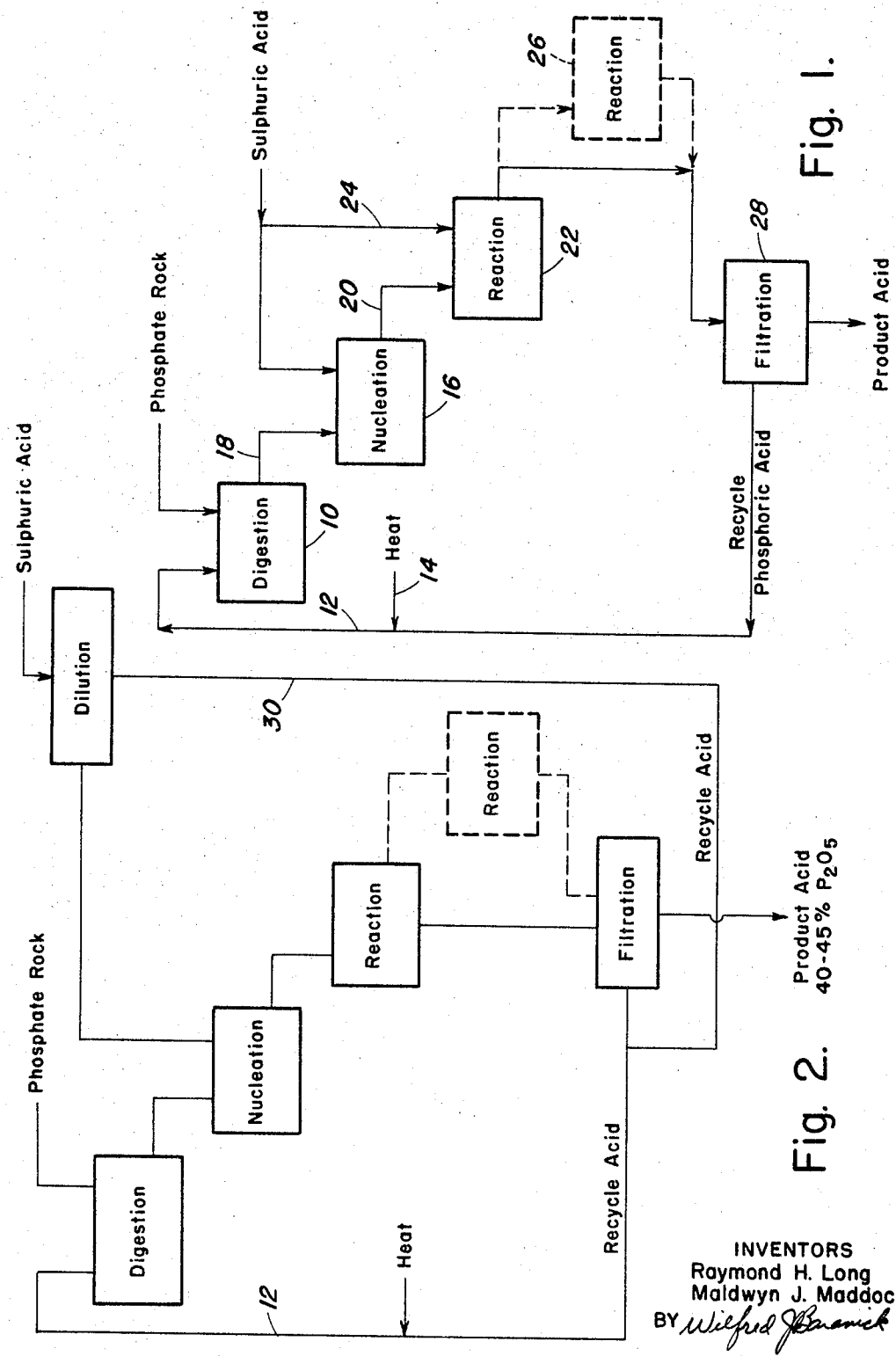

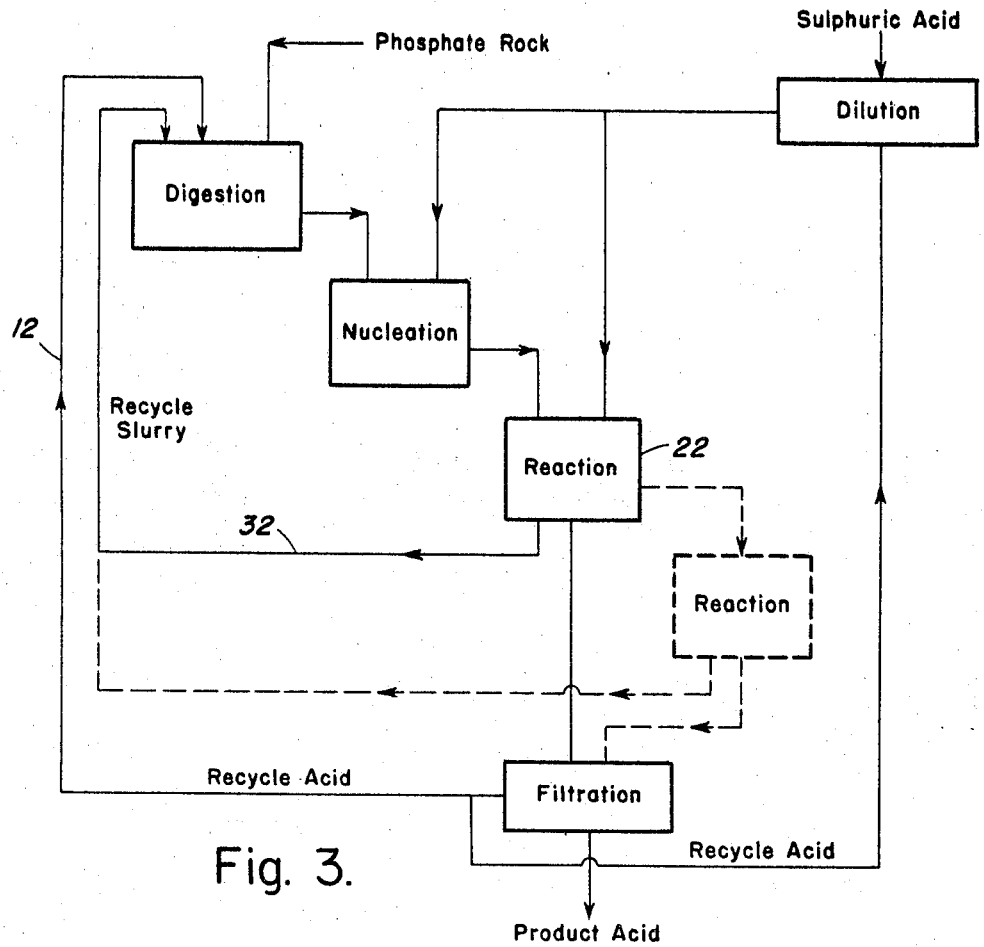
Fig. 3.
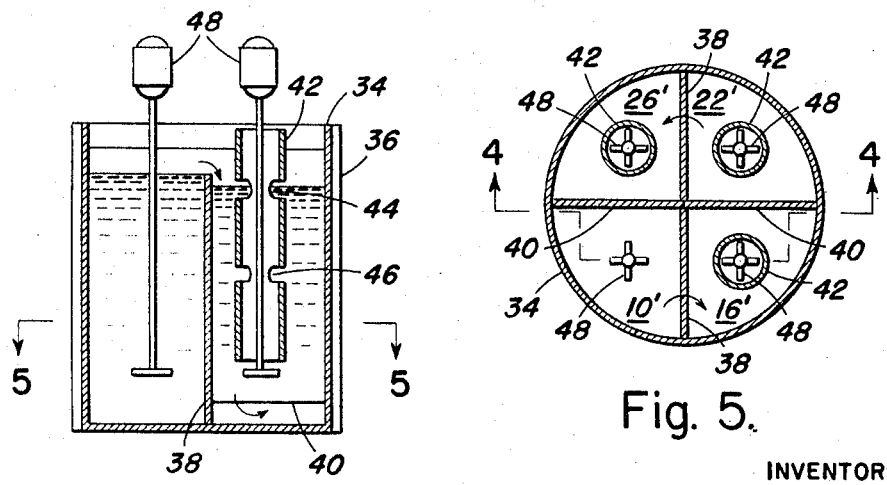
Fig. 4.
Fig. 5.

3,453,076
PHOSPHORIC ACID PROCESS
Raymond H. Long, Morristown, and Maldwyn J. Maddock, Elizabeth, N.J., assignors to The Lummus Company, New York, N.Y., a corporation of Delaware
Filed May 9, 1966, Ser. No. 548,786
Int. Cl. C01b 25/22
U.S. Cl. 23—165                                         12 Claims

ABSTRACT OF THE DISCLOSURE

Process for producing phosphoric acid by digesting a material containing tricalcium phosphate at a temperature of from 160°–175° F. with phosphoric acid having a $P_2O_5$ concentration of 30–40%, the phosphoric acid being employed to provide from 1.9–2.6 lbs. $P_2O_5$ per lb. of $P_2O_5$ in the material to produce a slurry of monocalcium phosphate in the acid. The slurry is introduced into a nucleation slurry of calcium sulfate hemi-hydrate and monocalcium phosphate in phosphoric acid and contacted with sulfuric acid in an amount corresponding to 50–85% of the stoichiometric equivalent of monocalcium phosphate. The nucleation slurry is contacted in a reaction vessel containing a slurry of calcium sulfate hemi-hydrate in phosphoric acid with additional sulfuric acid to provide at least the stoichiometric equivalent of monocalcium phosphate and phosphoric acid recovered therefrom. In accordance with a preferred embodiment, a slurry is passed from the reaction vessel to the initial digestion.

---

This invention relates to a process for the manufacture of phosphoric acid. In particular, this invention relates to a wet process for the manufacture of phosphoric acid, wherein calcium phosphate rock is digested with phosphoric acid and the product reacted with sulfuric acid to produce calcium sulfate and phosphoric acid.

The reactions which take place in a wet phosphoric acid process of the above type may be described by the following equations:

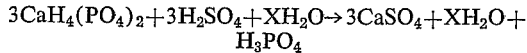

In the first reaction, the phosphate rock is digested by the phosphoric acid with the formation of calcium monophosphate. In the second, the calcium monophosphate reacts with sulfuric acid to produce phosphoric acid (in excess of the amount used for digestion of the rock), and calcium sulfate. The calcium sulfate may be in the form of anhydrous calcium sulfate, hemi-hydrate or dihydrate, depending on the reactor temperature and acid concentration. Thus, the value of X in the second equation may be 0, ½ or 2.

Low temperatures and acid concentrations favor the formation of dihydrate crystals. High temperatures and acid concentrations result initially in the production of hemi-hydrate crystals which may purposely be dehydrated, to anhydrous calcium sulfate crystals.

Most current practical phosphoric acid processes are such that the calcium sulfate is produced in the dihydrate form. The dihydrate type of process, however, suffers from a number of disadvantages. Among these may be mentioned the fact that the comparatively low temperatures which must be used tend to result in slow or incomplete digestion of the rock, which in turn slows down the reaction with sulfuric acid and also results in losses of $P_2O_5$ value by virtue of the coating of the undigested particles with insoluble calcium sulfate. The slow reaction rate, in turn, necessitates long retention times, commonly from 4 to 8 hours, resulting in a large in-process inventory, and requiring large reactor volumes.

Also, in dihydrate processes, the reaction with sulfuric acid is highly exothermic, and means must be provided for cooling the slurry, lest it exceed the transition temperature, and produce unwanted calcium sulfate hemi-hydrate instead of the dihydrate.

Moreover, it has been found in practice that the dihydrate type of process is economically incapable of producing phosphoric acid at a strength higher than about 32% $P_2O_5$ equivalent. Consequently, when stronger acid is required, it is necessary to resort to subsequent evaporation procedures. Considering that concentrated phosphoric acid is highly hygroscopic material, such concentration evaporation tends to be difficult as well as expensive in terms of fuel consumption.

Moreover, certain impurities originally present in the rock tend to be carried through into the product when the acid concentration is low, as in dihydrate process acid, which are insoluble in more concentrated acid and thus could be removed with the calcium sulfate if the product acid were more concentrated.

The above difficulties are not, in general, experienced when using a hemi-hydrate process. The hemi-hydrate type of process employs higher temperatures, which facilitate the rapid and complete digestion of the rock. Cooling the slurry is not necessary, because the high temperatures produced by reaction with the sulfuric acid are in fact beneficial. They ensure that the desired form of calcium sulfate will be produced, and also speed up the reaction, thus reducing the required residence time in the reactor, and minimizing the necessary capital investment for a given volume of production.

Hemi-hydrate processes also are capable of producing a stronger acid product, of the order of 40 to 45% $P_2O_5$, which eliminates or reduces the cost of subsequent evaporation, and tends to precipitate impurities so that they are filtered out with the calcium sulfate.

Certain difficulties have also been experienced with the hemi-hydrate type of process, however, which have until now prevented wider acceptance of this type of process. Foaming difficulties have been experienced in the reactor stage, which can only be alleviated by the use of antifoam agents. Such foaming, at best, cuts down on the effective capacity of the equipment and, at worst, results in spillage, safety hazards, and serious interference with the desired chemical reactions.

The hemi-hydrate type of process has also heretofore been beset by a vexing difficulty caused by the characteristics of the calcium sulfate precipitate. It is essential to the success of the process to produce a stable, readily filtrable hemi-hydrate crystal. This is essential because unstable crystals may hydrate when washed on the filter cake. With successive washings, the crust hardens and filtration rates are drastically reduced. In such a situation, reaction system rapidly overloads the filtration equipment. Also, the crust formation reduces the washing efficiency, and the overall extraction yield for the process is severely impaired.

A further disadvantage of the known phosphoric acid processes is that they are incapable of producing high yields of high-concentration acid from relatively low-grade ores, except by the use of uneconomically high recycle ratios, which increase the in-process inventory and correspondingly diminish the efficiency of utilization of the equipment.

An object of this invention, therefore, is to provide an improved process for the manufacture of phosphoric acid.

Another object is to provide a process characterized by improved speed and efficiency of digestion.

Still another object is to provide a phosphoric acid process characterized by improved speed and efficiency of reaction in the reactor stage.

A further object is to provide such a process, wherein it is not necessary to provide for cooling of the reactor slurry.

Yet another object is to provide a process capable of producing phosphoric acid of a strength in excess of 40% $P_2O_5$ prior to any evaporative concentration.

Another object is to provide a process capable of producing phosphoric acid of improved purity.

An additional object is to provide a phosphoric acid process wherein foaming problems are at a minimum.

Another object is to provide a process wherein calcium sulfate crystals are produced in a stable, readily filtrable form.

A further object is to provide a process which may be used with phosphate rock from any given source to effect high yields and high product acid concentration with lower in-process inventory requirements than other hemi-hydrate processes.

Other objects and advantages will become apparent from the following more complete description and claims, and by reference to the accompanying drawings.

In one particularly desirable aspect, this invention contemplates a process for the production of phosphoric acid, comprising in combination the steps of continuously reacting finely-divided tricalcium phosphate with excess phosphoric acid at a temperature between about 160 and about 175° F., thereby forming a digestion slurry of monocalcium phosphate in said acid, continuously withdrawing said digestion slurry and continuously introducing the same into a nucleation slurry of calcium sulfate hemi-hydrate and monocalcium phosphate in phosphoric acid, continuously adding to said nucleation slurry sulfuric acid at a rate to supply sulfuric acid in amount corresponding to between 50 and 85% of the stoichiometric equivalent of the monocalcium phosphate introduced in said digestion slurry, continuously withdrawing said nucleation slurry and continuously introducing the same into a reaction slurry of calcium sulfate hemi-hydrate in phosphoric acid, continuously adding to said reaction slurry sulfuric acid at a rate to supply sulfuric acid in amount corresponding substantially to the stoichiometric equivalent of the monocalcium phosphate introduced in said nucleation slurry; continuously withdrawing said reaction slurry, and recovering therefrom a filtrate consisting essentially of phosphoric acid.

The process of this invention falls into the general category of a "hemi-hydrate" type of phosphoric acid process from the viewpoint that the calcium sulfate is precipitated in the form of hemi-hydrate crystals. It possesses, however, a number of features which distinguish it from hemi-hydrate phosphoric acid processes as heretofore practiced.

The digestion step is carried out by reacting tricalcium phosphate in finely-divided form with an excess of phosphoric acid. The tricalcium, phosphate is, for example, ground phosphate rock, at least about 70–85% of which is finer than 200 mesh. The phosphoric acid serves both as a reactant and as the reaction medium, constituting the liquid phase of the digestion slurry. The concentration of the phosphoric acid is not critical, but to maintain at least 40% $P_2O_5$ product acid it is necessary to use a fairly concentrated acid, for example about 30% $P_2O_5$, which may suitably be warm acid recycled from the first wash at the filtration end of the line.

The amount of phosphoric acid is also not critical, provided there is sufficient to react with the tricalcium phosphate and sufficient, in addition, to form a flowable slurry with the monocalcium phosphate product resulting from the digestion reaction.

While the quantity of phosphoric acid used in the digestion stage is not critical in the sense that considerable excess may be used if desired, it is nevertheless highly advantageous to employ comparatively limited amounts, because the use of large excess of recycled product phosphoric acid increases the circulating load on the system and the in-process inventory, thus diminishing the effective capacity of the equipment, and also increases the amount of heat that must be supplied in order to maintain the indigestion stage at the required temperatures. Also the use of large quantities of recycled product phosphoric acid increases the circulating water content of the system, making it more difficult to maintain the desired high $P_2O_5$ concentration in the product acid.

One of the significant advantages of the process of this invention, therefore, is that it makes possible the use of much smaller amounts of recycled product phosphoric acid than have required according to the processes heretofore employed for phosphoric acid production. In practice, it has been found that optimum results are obtained when the amount of phosphoric acid supplied to the digestion, at about 30% $P_2O_5$ concentration, is such as to provide between about 1.9 and about 2.6 pounds of $P_2O_5$ per pound of $P_2O_5$ in the phosphate rock.

The digestion operation is preferably carried out at a temperature between about 160 and 175° F., and the digestion slurry may appropriately be maintained at a temperature within this range by preheating the recycled phosphoric acid prior to introducing it into the vessel in which the digestion is carried out. Another method of maintaining the appropriate temperature is to recycle hot reactor slurry (which is heated by the exothermic reaction between the sulfuric acid and the monocalcium phosphate) into the digestion vessel, as more fully described below. Other methods of heating the digestion slurry, for example steam coils, steam jackets and the like, are also operable, although not economical in practice, as there is normally enough heat generated in the nucleation and reaction slurries to supply the needs of the digestion step.

Some foaming may be expected to take place during the digestion reaction, owing to the presence of carbonates and organic matter in the phosphate rock, but this is easily broken by suitable agitation, and is totally unlike the stubborn foams produced in the "reaction" stage (i.e. the stage where $H_2SO_4$ is introduced) in conventional dihydrate processes.

The dimensions of the digest vessel are preferably so related to the rate of introduction of phosphate rock and makeup phosphoric acid, that the average residence time of the reactants in the digestion vessel is about 10 to 25 minutes. At the temperature indicated, and using rock ground to the fineness above mentioned this period of residence is ordinarily sufficient to achieve virtually quantitative conversion of the tricalcium phosphate of the rock to monocalcium phosphate.

The product of the digestion reaction is a slurry of monocalcium phosphate in phosphoric acid. A portion of the slurry is continuously withdrawn from the digestion vessel, at such a rate as to maintain a substantially constant level in the digestion vessel, and the withdrawn digestion slurry is continuously introduced into a nucleation slurry contained in a second vessel (or a second chamber of a multi-chambered vessel).

The composition of the nucleation slurry is essentially that resulting from reaction of the digestion slurry with an amount of sulfuric acid amounting to between about 50 and about 85% of that theoretically required to react with the monocalcium phosphate in the digestion slurry. It therefore contains calcium sulfate, and residual monocalcium phosphate as solid constituents of the slurry, and phosphoric acid as the liquid phase. It is to be understood here, as elsewhere in the present specification and in the claims, that the composition of the slurry as above described in somewhat idealized, because the process is a continuous one and the reactions require a finite time period to reach completion. Thus in the nucleation slurry at any given instant, there is present a minor amount of sulfuric acid which has not yet reacted with monocalcium phosphate. The same applies to the reaction slurry. However, in the interests of brevity, such minor and transitory amounts of substances inherently unstable in the environment have ben disregarded, both in the specification and in the claims.

The concentration of the sulfuric acid used in the nucleation step, as well as that used in the subsequent reaction step, may be varied over a considerable range. Sulfuric acid having a concentration anywhere in the range 60% to 93% (wt.) may be used for the embodiment illustrated in FIGURE 1 of the drawings, and acid having a concentration anywhere between 60% and 98% may be used for the embodiments shown in FIGURES 2 and 3 (in which the sulfuric acid is mixed with recycle phosphoric acid before being introduced into the slurry). The choice of acid concentration affects the water balance, and is partly contingent on the grade of phosphate rock being processed (i.e. on the $P_2O_5$ content thereof). This flexibility in acid concentration constitutes a distinct advantage of the process according to the invention, as it provides a means of controlling the water content of the system, and/or of selecting the acid concentration on the basis of external considerations, such as availability of by-product or reclaimed acid from other processes, etc.

According to an important feature of the invention, the conditions in the nucleation slurry are carefully controlled to produce calcium sulfate hemi-hydrate nuclei which result in the formation of a stable, easily-filtered precipitate of calcium sulfate hemi-hydrate. These conditions are empirical to a very considerable extent, and it is difficult to lay down general principles as to the conditons which produce the desired form of nuclei. However, it has been found that, when the temperature of the incoming digestion slurry is between about 160 and 175° F., and the temperature of the body of nucleation slurry is between about 220 and 240° F., and the sulfuric acid added to the incoming monocalcium phosphate is equivalent to between about 50 and 85% the stoichiometric requirements to convert the monocalcium phosphate, the reaction of the continuously-added sulfuric acid with the monocalcium phosphate results in the production of a calcium sulfate hemi-hydrate which is readily filtratable and stable toward water washing. The precise reasons for this are not fully established, but it is believed that the characteristics of the crystalline precipitate are largely established at the critical moment when the crystal nuclei are first formed, and that the formation of the nuclei are profoundly affected by the environment in which such formation takes place.

Although a primary purpose of the nucleation operation is to provide the conditions of incipient crystallization that eventually result in a stable, filtrable precipitate, it is inherent in the nature of the process that some of the actual precipitation also takes place in the nucleation tank. This is not harmful, and may be helpful in that it provides a supply of hemi-hydrate crystals in the nucleation slurry which may serve as "templates" for the formation of the desired type of nuclei.

Precipitation of the calcium sulfate hemi-hydrate cannot go to completion in the nucleation slurry, however, for the simple reason that amounts of sulfuric acid higher than about 85% of stoichiometric cannot be successfully used in the nucleation slurry. Amounts higher than about 85% (or lower than about 50%) of stoichiometeric result in the formation of a less desirable form of calcium sulfate hemi-hydrate. It is therefore necessary to complete the reaction between monocalcium phosphate and sulfuric acid in a separate "reaction" stage, as described below.

Further with respect to the nucleation step, the relative temperatures of the body of nucleation slurry and the incoming digestion slurry are important. According to the process of this invention there is a temperature difference of some 45–80° F. between the temperature of the digestion slurry (160–175° F.) and the temperature of the main body of nucleation slurry (220–240° F.). This temperature difference is a prime factor influencing the type of nuclei formed.

The reaction of monocalcium phosphate with sulfuric acid is completed in the reaction slurry. The reaction slurry (disregarding the transistory presence of reactants, as noted above) consists essentially of a dispersion of calcium sulfate hemi-hydrate in phosphoric acid. Nucleation slurry is continuously withdrawn from the nucleation vessel, and introduced into the reaction slurry. Simultaneously, sulfuric acid is continuously introduced into the reaction slurry at such a rate as to supply substantially the stoichiometric equivalent to react with the monocalcium phosphate introduced by way of the incoming nucleation slurry. A small excess (say 1 to 2%) over the theoretical quantity may be used, at the risk of having a minor quantity of sulfuric acid present as an impurity in the product acid, or a slight deficiency, of the same order of magnitude may be used, which will prevent the appearance of sulfuric acid in the product, but may also result in a corresponding loss of $P_2O_5$ values which are filtered out with the calcium sulfate in the form of unreacted monocalcium phosphate. In general, it is preferred to add sulfuric acid to the reaction slurry, in amounts as nearly as practicable exactly equivalent to the amounts of monocalcium phosphate introduced by way of the incoming nucleation slurry.

The reaction slurry is continuously drawn off at a rate to keep the level in the reaction slurry vessel approximately constant, and is filtered. The filtraiton, which may be either continuous or batchwise, is carried out in conventional fashion, and need not be described in detail. In accord with conventional practice, it will ordinarily be carried out on a horizontal rotary pan-filter or the like, and washed three times, each time using a volume of wash liquid approximately equal to the volume of the filter cake. The first wash liquid is dilute phosphoric acid which has passed through a filter cake once, in the second wash of a previous cycle. The second wash is a more dilute phosphoric acid resulting from the third wash of a previous cycle. The third wash is water. After passing through the cake, the first wash liquid is a fairly concentrated acid (about 30%) which may be recycled and used for digestion of fresh phosphate rock, as noted above.

Within the general framework of the process of this invention as just described, numerous variations and refinements are possible, some of which are described in more detail below.

Referring now to the figures:

FIGURE 1 is a flowsheet diagram of one embodiment of the process of this invention.

FIGURE 2 is a flowsheet diagram of another embodiment of the invention.

FIGURE 3 is a flowsheet diagram of a third embodiment of the invention.

FIGURE 4 is a vertical cross section of one form of apparatus suitable for carrying out the process of the invention, taken along line 4—4 of FIGURE 5.

FIGURE 5 is a horizontal cross section of the same apparatus, taken along line 5—5 of FIGURE 4.

Referring now more particularly to FIGURE 1, phosphate rock, about 70 to 85% of which is minus 200 mesh, is fed into digester 10. In this digester, warm 30% $P_2O_5$ recycle phosphoric acid from the washing operation is added to the rock through recycle line 12. The phosphoric acid recycle stream is preheated by heat exchange or any other appropriate means, indicated generally at 14, to a temperature sufficient to maintain the operating temperature in digester 10 at a level between about 160 and 175° F.

The residence time in digester 10 may vary from about 10 to 25 minutes depending on the nature of the phosphate rock. It is important to insure high extraction yields, that the rock be digested as completely as possible in this stage of the operation. Rapid agitation, for example by the use of a turbine agitator, is desirable to ensure complete digestion.

The slurry from digester 10 flows continuously into nucleation vessel 16. Sulfuric acid of a concentration between about 60% and 93% $H_2SO_4$ is added to the nucleation vessel at such a rate that sulfuric acid is supplied in amount sufficient to react with from 50 to 85% of the monocalcium phosphate entering the nucleation vessel through line 18 in the form of digester overflow. The nucleation vessel is heated by the heat of the exothermic reaction and is maintained at temperature between about 220 and about 240° F. The contents of the nucleation vessel are continuously withdrawn through line 20. The rates of feed through line 18 and discharge through line 20 are correlated with the level maintained in the nucleation vessel so as to maintain the level substantially constant and to provide an average residence time in this vessel of from 10 to 25 minutes. In the nucleation vessel the sulfuric acid reacts with 50 to 85% of the monocalcium phosphate and produces, first crystal nuclei, and then a portion of the calcium sulfate hemi-hydrate crystals.

The material withdrawn from the nucleation vessel through line 20 is fed into reaction vessel 22. Additional sulfuric acid is added to the contents of the reaction vessel 22 through line 24, in amount substantially equivalent to react with the monocalcium phosphate introduced therein as unreacted monocalcium phosphate remaining in the nucleation slurry.

Under conditions of efficient agitation in all reaction stages, the reaction of sulfuric acid with the monocalcium phosphate is essentially complete in reaction vessel 22, maintaining a temperature of 200 to 240° F., and a residence time of 10 to 25 minutes. In some cases it may be desirable to add a second reaction vessel 26 maintained at a temperature of 200 to 240° F., and with flow rates adjusted to give an average residence time in reaction 26 of from 10 to 25 minutes. This additional residence time permits the reaction further opportunity to reach completion, and is sometimes helpful with phosphate rock materials of coarser grind or lower reactivity than usual.

Slurry from reaction vessel 22 (or vessel 26, if used) is passed to filter 28 where the product acid is obtained by filtration and washing of the hemi-hydrate crystals.

The amount of phosphoric acid recycle from the filtration operation to the digestion stage through line 12 may be varied depending on the source of rock and on the water balance in the system. In most cases the amount recycled corresponds to between 1.9 and 2.6 pounds of $P_2O_5$ per pound of $P_2O_5$ contained in the rock. The recycle acid may have a concentration between about 30 and about 40% $P_2O_5$. The total sulfuric acid addition in nucleation vessel 16 and reaction vessel 22 is essentially stoichiometric.

This method of operation gives good recovery of $P_2O_5$ values, up to about 97%, and provides excellent filtration rates, exceeding 110 gallons per hour per square foot of filter area.

FIGURE 2 illustrates a refinement of the process as illustrated in FIGURE 1. The process according to FIGURE 2 is similar to that of FIG. 1, except for the fact that phosphoric acid is recycled from the filtration stage, not only to the digestion, but also to a dilution box where it is used to dilute the sulfuric acid before the latter is fed to the nucleation and reaction stages.

It has been found that the production of nuclei which result in a stable and filtrable form of calcium sulphate hemi-hydrate is favored by conditions which promote ionization of the sulfuric acid. Ionization may be favored by using sulfuric acid diluted with water in the process according to FIG. 1. It is more efficient and desirable, however, to employ for the purpose some of that water which is already in the system, rather than introducing additional water in the form of dilute sulfuric acid. The acid recycle rate to the dilution box through line 30 as well as that recycled to the digestion through line 12 may be varied depending on the source of the rock and on the water balance. For example, the process according to FIGURE 2, using Florida phosphate rock with 0.45 pound of $P_2O_5$ per pound of rock in line 12 and 0.15 pound $P_2O_5$ per pound of rock in line 30 yields a 40 to 45% $P_2O_5$ product acid at yields of up to 97% with good filtration and washing rates.

There is no lower limit to the amount of phosphoric acid recycled to the nucleation and reaction stages in this manner, such recycling being optional in any case. Excessive amounts of recycle are undesirable however, not only because they increase the circulating load unduly but because they may adversely affect conditions in the nucleation chamber and thereby result in the production of a less desirable form of nuclei and of precipitated calcium sulfate. Specifically, due account must be taken of the fact that recycling of phosphoric acid to the nucleation chamber increases the amount of water therein. Water is also introduced with the digestion slurry introduced into the nucleation chamber, and with the sulfuric acid, in amounts depending on the concentration of acid used. When the amount of water becomes excessive depending on the temperatures maintained in the system and on the filter, there is a danger of producing calcium sulfate dihydrate crystals, instead of the desired hemi-hydrate. The production of dihydrate crystals is highly undesirable according to the process of this invention, because it interferes seriously with the subsequent filtration, decreasing filtration rate and necessitating excessive amount of wash water, which dilute the product acid, It has been found that, when operating at the recommended temperature in the nucleation zone—i.e. 200 to 240° F., this difficulty can be avoided by maintaining the concentration of phosphoric acid in the nucleation zone at no less than about 30%. This limitation could theoretically be met by recycling large amounts of phosphoric acid at, say 30–40% $P_2O_5$ concentration, but only at the cost of employing very large circulating loads, and cooling the nucleation zone to such an extent that its exothermic heat would in most cases be insufficient to maintain proper operating temperatures. In practical operations, therefore, the requirement that the nucleation be maintained at a minimum of 30% $P_2O_5$ concentration must be met by limiting the water input to the system, by restricting the amount of phosphoric acid recycled and/or by using sulfuric acid of sufficiently high concentration to limit the water input, and by avoiding the use of excessively dilute recycled phosphoric acid. Also, when the phosphoric acid concentration in the nucleation zone is near the lower limit of 30%, it is usually advisable to operate at temperatures in the upper, rather than the lower portion of the 200–240° F. range, to minimize any effects of local temperature variations. In practice, when operating according to the conditions of temperature, acid concentration, etc. as elsewhere set forth herein, a 30% phosphoric acid recycle in amount equivalent to about 0.45–0.47 pound of $P_2O_5$ per pound of $P_2O_5$ in the phosphate rock is suitable, although this range may be extended upwardly or downwardly to compensate for conditions obtaining in the nucleation chamber, according to the criteria set forth above.

A further refinement of the process is illustrated in FIG. 3. The process according to FIG. 3 is similar to that of FIG. 2, except that a portion of the contents of the reaction vessel is recirculated to the digestion stage in addition to the filtrate acid recycled thereto through line 12. A principal purpose of such recycling is to provide efficient use of the reaction heat contained in the slurry of the reaction vessel. The equilibrium temperature of the digestion slurry in the absence of added heat would be in the neighborhood of 110° F. For efficient digestion according to the present invention, this temperature must be raised to a level between 160 and 175° F. This can be done by heating the recycle acid in line 12 (according to the processes of FIGS. 1 and 2), or more effectively by recycling a portion of the reaction slurry from reaction vessel 22 through line 32.

The amount of slurry recycled to the digestion stage in the embodiment of the invention according to FIG. 3 may be varied over a considerable range. However, it has been found that under usual conditions, best results are obtained when the amount of slurry thus recycled is such as to provide between about 1.5 and about 8 pounds of $P_2O_5$ per pound of $P_2O_5$ in the rock, in addition to the 1.9 to 2.6 pounds of $P_2O_5$ supplied as phosphoric acid. Slurry recycle rates below the range mentioned are generally not sufficient to maintain the digestion vessel temperature in the desired temperature range, while slurry recycle ratios greater than about 8 pounds $P_2O_5$ per pound of $P_2O_5$ in the rock merely increase the circulation load on the system.

The recycling of slurry to the digestion chamber in the manner just described also serves another purpose, in that it serves to minimize the effect of local temperature variations, serving in effect as a "flywheel" to stabilize the operating temperatures. For the same reason, slurry may if desired be partially recycled from the reaction chamber(s) to the nucleation stage.

FIGURES 1, 2 and 3 illustrate the operations of the process of this invention in schematic flowsheet form. In actual practice the process can be carried out in a series of tanks connected by suitable overflow weirs, connecting piping, etc. A more compact and efficient manner of carrying out the reaction is by using an apparatus such as that illustrated in FIGURES 4 and 5, which is a single multi-chamber vessel providing separate zones for the digestion, nucleation and reaction operations.

As shown in FIGURES 4 and 5 the preferred apparatus for carrying out the process according to this invention is a chambered tank comprising a cylindrical or square outer wall 34 which may suitably be constructed of corrosion- and abrasion-resistant material such as carbon brick in contact with the slurry backed by a rubber or other suitable membrane and supported by a shell 36 of steel or other structurally strong material. The space within wall 34 is divided into segments by baffles 38 and 40. Baffle 38 extends diametrically across the chamber, extends to the bottom of the chamber and extends upwardly to a point somewhat short of the top of the chamber. Baffle 40 extends diametrically across the chamber at right angles to baffle 38, and extends at its upper margin to a level somewhat higher than the top of baffle 38. At its lower margin baffle 40 is somewhat spaced above the bottom of the chamber. Baffles 38 and 40 therefore cooperate to divide the chamber defined by wall 34 into four quadrantal segments, 10', 16', 22' and 26', separated by baffles 38 and 40 in such a way that segment 10' and segment 16' are separated by a relatively low baffle 38 so that slurry can overflow from segment 10' into 16'. Segments 16' and 22' are separated by a relatively high baffle spaced, however, from the bottom of the tank so that slurry can flow under baffle 40 from segment 16' into segment 22', and segments 22' and 26' are separated by a low baffle 38 so that slurry can overflow from segment 22' into segment 26' over baffle 38. It will be recognized that segment 10' may serve as the digestion vessel, segment 16' as the nucleation vessel, segment 22' (and segment 26', if needed), as reaction vessels. Draft tubes 42 are provided for directing the fluid flow through the segments and may appropriately be slotted as indicated at 44 and 46 to facilitate proper control of the flow of the slurry. Circulation of slurry is facilitated by turbine agitator 48 and also, as may be desired, by suitable pumps or the like (not shown).

In order to illustrate more fully the nature of this invention and the manner of practicing the same, the following examples are presented:

Example I

In a process according to the embodiment of the invention illustrated in FIGURE 1, ground phosphate rock was fed to digestion vessel 10 at a feed rate of 2.4 lbs./hour and digested with recycle phosphoric acid supplied at the rate of 1.56 lbs. per hour of $P_2O_5$. The temperature in digestion vessel 10 was maintained at 160° F. and the flow rates and liquid level were adjusted so as to give an average residence time in the digester of 25 minutes. The following reaction conditions were maintained in the various vessels:

| Vessel | Temperature, ° F. | Residence, Minutes | Sulfuric Acid, lbs./hr. |
|---|---|---|---|
| Digester, 10 | 160 | 25 | |
| Nucleation, 16 | 222 | 15 | 1.03 |
| Reaction, 22 | 222 | 15 | 1.03 |
| Reaction, 26 | 223 | 20 | |

Under these conditions, the following product was obtained on filtration of the slurry:

| | Percent |
|---|---|
| $P_2O_5$ | 41.6 |
| $SO_4$ | 0.4 |
| $H_2O$ | Balance |

Analysis of the filter cake indicated an overall $P_2O_5$ recovery of 94.0%.

Example II

In a process according to the embodiment of the invention shown in FIGURE 2 of the drawings, ground phosphate rock was fed to the digestion vessel at a feed rate of 2.42 lbs./hr. and digested with recycle phosphoric acid supplied at the rate of 1.28 lbs./hr. of $P_2O_5$. The temperature in the digestion vessel was maintained at 160° F., and the flow rates and the liquid level were adjusted so as to give an average residence time in the digester of 25 minutes.

Recycle phosphoric acid was also mixed with the 71.8% sulfuric acid feed to the nucleation stage, at the rate of 0.3 lb. $P_2O_5$/hr.

The following reaction conditions were maintained in the various vessels:

| Vessel | Temperature, ° F. | Residence, Minutes | Sulfuric Acid, lbs./hr. |
|---|---|---|---|
| Digester, 10 | 160 | 25 | |
| Nucleation, 16 | 220 | 15 | 2.23 |
| Reaction, 22 | 232 | 15 | 0.56 |
| Reaction, 26 | 232 | 20 | |

Under these conditions, the following product was obtained on filtration of the slurry:

| | Percent |
|---|---|
| $P_2O_5$ | 42.3 |
| $SO_4$ | 0.11 |
| $H_2O$ | Balance |

Analysis of the filter cake indicated an extraction efficiency of 91.2, based on the $P_2O_5$ content of the original rock, and an overall recovery rate, on the same basis, of 86.0.

The reaction slurry filtered rapidly, the product acid filtering at the rate of 33.8 gal./hr./sq. ft., or 235.0 lbs. $P_2O_5$/hr./sq. ft., while the corresponding rates for the product acid and washes considered as a whole were 56.0 gal./hr./sq. ft., or 100.0 lbs. $P_2O_5$/hr. sq. ft., respectively.

Example III

In a process according to the embodiment of the invention shown in FIGURE 3 of the drawings, ground phosphate rock was fed to the digestion vessel at a feed rate of 2.59 lbs./hr. and digested with recycled product phosphoric acid supplied at the rate of 1.43 lbs./hr. of $P_2O_5$, and recycled slurry from the reaction vessel 26 supplied at the rate of 43.7 lbs./hr. The temperature in the digestion vessel was maintained at 174° F. and the flow rates and liquid level were adjusted so as to give an average residence time of rock phosphate in the digestion vessel of 15 minutes.

The following reaction conditions were maintained in the various vessels:

| Vessel | Temperature, °F. | Residence, Minutes | Sulfuric Acid, lbs./hr. |
|---|---|---|---|
| Digester, 10 | 174 | 15 | |
| Nucleation, 16 | 231 | 15 | 1.73 |
| Reaction, 22 | 230 | 15 | 0.58 |
| Reaction, 26 | 230 | 20 | |

Under these conditions, the following product was obtained on filtration of the slurry:

|  | Percent |
|---|---|
| $P_2O_5$ | 39.8 |
| $SO_4$ | 2.0 |
| $H_2O$ | Balance |

Analysis of the filter cake indicated an extraction efficiency of 95.0% and an overall recovery efficiency of 94.0%, based on the $P_2O_5$ content of the feed rock.

The product acid filtered even more rapidly than that of Example II, the product acid filtering at a rate of 43.4 gal./hr./sq. ft. or 197.0 lbs. $P_2O_5$/hr./sq. ft., while the product acid and the washes taken together filtered at 52.6 gal./hr./sq. ft. or 100.0 lbs. $P_2O_5$/hr./sq. ft.

All three of the above descirbed embodiments of the invention, corresponding to Examples I, II and III and to FIGURES 1, 2 and 3 of the drawings, respectively, possess distinct operational and economic advantages over the dihydrate or gypsum process, and over previously-proposed hemi-hydrate processes. Of the three embodiments, that of FIGURE 2 and Example II is preferred to that of FIGURE 1 and Example I, because it provides greater flexibility, in that the concentration and quantity of phosphoric acid recycled to the nucleation of FIGURE 3 and Example III, in turn, is preferred over the strength of the product acid and over the conditions under which the nuclei are produced. The embodiment of FIGURE 3 and Example III, in turn, is preferred over that of FIGURE 2 and Example II, because the recycle of slurry to the digestion stage provides a control over the temperature and composition of the digestion slurry, and makes economical and efficient use of exothermic reaction heat to maintain the required elevated temperature in the digestion stage.

The process of this invention, as above described, is an improved method for the manufacture of phosphoric acid. It is characterized by improved speed and efficiency of digestion, reduced overall residence time in the system, and very high percentage recoveries of the $P_2O_5$ values of the phosphate rock. Yields of up to 97% of available $P_2O_5$ are regularly obtained using the process of this invention as compared with reported yields of 88–92% for typical prior art hemi-hydrate processes. The process of this invention eliminates the need for cooling of the reactor slurry, and produces phosphoric acid of a concentration corresponding to about 40–45% $P_2O_5$ (by weight) prior to any evaporative concentration. Because of the high concentration of the product acid, the purity of the product tends to be higher than that produced by processes leading to acid products of lower concentration. Foaming problems are reduced or eliminated because the digestion of the phosphate rock is substantially complete in the digestion stage, and the foam produced in the digestion operation is easily broken up by agitation.

The process is particularly advantageous in that calcium sulfate hemi-hydrate crystals are produced in a stable and easily filtrable form, over a widely variable range of operating conditions.

The process of the invention is also particularly advantageous in that one or more of the embodiments described above may be used to extract phosphoric acid from any given source of phosphate rock, effecting high yields and high product acid concentrations with lower in-process inventory requirements than are required for other hemi-hydrate processes. The high reaction temperatures would favor the complete digestion of the less reactive rocks resulting in better yields. In the embodiment illustrated in FIGURE 1, these improved results are principally due to the process conditions (160–175° F. in the digester and preferably between 220 and 240° F. in the nucleation slurry and 200 to 240° F. in the reaction slurry), coupled with rapid agitation which permit overall attack system residence times in the 30 to 75 minutes range for effective performance. In the embodiments illustrated in FIGURES 2 and 3, these improved process conditions permit good performance with substantially lower phosphoric acid and/or slurry recycle rates than are customarily used for other hemi-hydrate processes. The lower recycle rates, in turn, are reflected in lower in-process inventories for any specified residence time and consequently more efficient utilization of plant and equipment.

While this invention has been described with reference to certain preferred embodiments and illustrated by way of certain drawings and examples, these are illustrative only, as many alternatives and equivalents will readily occur to those skilled in the art, without departing from the spirit or proper scope of the invention. The invention is therefore not to be construed as limited, except as set forth in the appended claims.

We claim:
1. A process for the production of phosphoric acid, comprising in combination the steps of reacting finely-divided material containing tricalcium phosphate with phosphoric acid at a temperature between 160 and about 175° F., said phosphoric acid having a concentration between about 30% and about 40% $P_2O_5$ and being present in an amount to provide between about 1.9 and about 2.6 lbs. of $P_2O_5$ per lb. of $P_2O_5$ present in said material thereby forming a digestion slurry of monocalcium phosphate in said acid, introducing the same into a nucleation slurry of calcium sulfate hemi-hydrate and monocalcium phosphate in phosphoric acid, adding to said nucleation slurry sulfuric acid at a rate to supply sulfuric acid in an amount corresponding to between 50 and 85% of the stoichiometric equivalent of the monocalcium phosphate introduced in said digestion slurry, withdrawing said nucleation slurry and introducing the same into a reaction slurry of calcium sulfate hemi-hydrate in phosphoric acid, adding to said reaction slurry sulfuric acid at a rate to supply sulfuric acid in an amount corresponding substantially to the stoichiometric equivalent of the monocalcium phosphate introduced in said nucleation slurry, withdrawing said reaction slurry, and recovering therefrom phosphoric acid.

2. The process of claim 1 wherein at least a portion of the phosphoric acid for reaction with the tricalcium phosphate is provided by recycle of phosphoric acid from the recovery step.

3. The process of claim 2 and further comprising employing phosphoric acid from the recovery for dilution of the sulfuric acid, said phosphoric acid employed for dilution having a concentration of from about 30% to about 40% as $P_2O_5$.

4. The process of claim 3 wherein the phosphoric acid employed for diluting the sulfuric acid is employed in an amount to provide from about 0.45 to about 0.47 lb. of $P_2O_5$ per lb. of $P_2O_5$ present in said material.

5. The process of claim 4 wherein the nucleation slurry is maintained at a temperature between about 220° F. and about 240° F. and the reaction slurry is maintained at a temperature between about 200° F. and about 240° F.

6. A process for the production of phosphoric acid comprising:
(a) contacting a material containing tricalcium phosphate with a reaction slurry as hereinafter defined in step (f) and phosphoric acid in a digestion zone; said phosphoric acid having a concentration of from about 30% to about 40% as $P_2O_5$ and being employed in an amount to provide from about 1.9 and about 2.6 lbs. of $P_2O_5$ per lb. of $P_2O_5$ present in said material, thereby forming a digestion slurry of monocalcium phosphate in said acid;

(b) introducing the digestion slurry into a nucleation zone containing a slurry of calcium sulfate hemi-hydrate and monocalcium phosphate in phosphoric acid;

(c) adding sulfuric acid to the nucleation slurry in an amount to provide from about 50% to about 85% of the stoichiometric equivalent of the monocalcium phosphate introduced in said digestion slurry to provide a nucleation slurry;

(d) introducing the nucleation slurry into a reaction zone, containing a reaction slurry of calcium sulfate hemi-hydrate in phosphoric acid;

(e) introducing sulfuric acid into the reaction zone in an amount to provide from about the stoichiometric equivalent of the monocalcium phosphate introduced in said nucleation slurry to about from 1% to about 2% excess of said stoichiometric equivalent;

(f) passing a portion of said reaction slurry to step (a), said reaction slurry having a concentration of from about 30% to about 40% as $P_2O_5$ and being employed in an amount to provide from about 1.5 to about 8 lbs. of $P_2O_5$ per lb. of $P_2O_5$ present in said material;

(g) passing another portion of said reaction slurry to a recovery zone to recover phosphoric acid.

7. The process of claim 6 and further comprising passing phosphoric acid from step (g) of claim 6 to provide phosphoric acid for step (a).

8. The process of claim 7 and further comprising, diluting the sulfuric acid employed in steps (c) and (e) of claim 6 with phosphoric acid from step (g) of claim 6, said phosphoric acid employed for diluting sulfuric acid having a concentration of from about 30% to about 40% as $P_2O_5$ and being employed in an amount to provide from about 0.45 to about 0.47 lb. of $P_2O_5$ per lb. $P_2O_5$ in said material.

9. The process of claim 8 wherein the nucleation zone is operated at a temperature of from about 220° F. to about 240° F. and the reaction zone is operated at a temperature from about 200° F. to about 240° F.

10. The process of claim 9 wherein the reaction slurry recycled in step (f) of claim 6 is provided in an amount within the defined range to supply heat requirements for maintaining the temperature within the digestion zone.

11. The process of claim 10 wherein the residence time in said digestion zone is from about 10 to about 25 minutes.

12. The process of claim 11 wherein the residence time in said nucleation zone is from about 10 to about 25 minutes.

References Cited

UNITED STATES PATENTS 2,885,264  5/1959  Peet _____ 23—165

OSCAR R. VERTIZ, *Primary Examiner.*

ARTHUR GREIF, *Assistant Examiner.*

U.S. Cl. X.R.

23—122

PO-1050
(5/69)

UNITED STATES PATENT OFFICE
CERTIFICATE OF CORRECTION

Patent No. 3,453,076      Dated  July 1, 1969

Inventor(s) R. H. LONG ET AL

It is certified that error appears in the above-identified patent and that said Letters Patent are hereby corrected as shown below:

Column 11, line 38, delete " of FIGURE 3 and Example III, in turn, is preferred" and insert --stage can be adjusted to provide a precise control--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents